(12) United States Patent
McAllister et al.

(10) Patent No.: US 7,748,984 B2
(45) Date of Patent: Jul. 6, 2010

(54) APPARATUS AND METHOD FOR INSTRUCTION IN ORTHOPEDIC SURGERY

(76) Inventors: Craig M. McAllister, 13649 62$^{nd}$ Ave. NE., Kirkland, WA (US) 98034; Steven Jacobson, 19308 Easterday Rd., Dupont, WA (US) 98327

( * ) Notice: Subject to any disclaimer, the term of this patent is extended or adjusted under 35 U.S.C. 154(b) by 1080 days.

(21) Appl. No.: 11/351,965

(22) Filed: Feb. 10, 2006

(65) Prior Publication Data
US 2007/0212672 A1 Sep. 13, 2007

(51) Int. Cl.
*G09B 23/28* (2006.01)
(52) U.S. Cl. ........................................ 434/274
(58) Field of Classification Search ............... 434/262, 434/267, 274; 411/30; 606/300, 301
See application file for complete search history.

(56) References Cited

U.S. PATENT DOCUMENTS

| | | | |
|---|---|---|---|
| 2,472,819 A * | 6/1949 | Giesen | 434/274 |
| 3,493,254 A * | 2/1970 | Jeal et al. | 403/408.1 |
| 4,106,219 A * | 8/1978 | Schneider et al. | 434/274 |
| 4,200,995 A * | 5/1980 | Trella | 434/274 |
| 4,331,428 A * | 5/1982 | Chandler | 434/274 |
| 4,433,961 A | 2/1984 | Chandler | |
| 4,802,858 A | 2/1989 | Lindskog et al. | |
| 4,850,877 A | 7/1989 | Mason et al. | |
| 5,014,719 A | 5/1991 | McLeod | |
| 5,401,131 A * | 3/1995 | Yoshino | 411/38 |
| 5,607,311 A * | 3/1997 | Browne-Wilkinson | 434/274 |
| 5,967,790 A * | 10/1999 | Strover et al. | 434/274 |
| 6,186,716 B1 * | 2/2001 | West et al. | 411/30 |
| 6,203,543 B1 | 3/2001 | Glossop | |
| 6,409,516 B1 * | 6/2002 | Thill | 434/274 |
| 7,384,268 B2 * | 6/2008 | Browne-Wilkinson | 434/274 |
| 7,491,236 B2 * | 2/2009 | Cragg et al. | 623/17.11 |
| 2002/0062618 A1 * | 5/2002 | Pourtier | 52/698 |
| 2004/0199165 A1 | 10/2004 | Culbert et al. | |
| 2005/0008450 A1 * | 1/2005 | Gauthier | 411/387.1 |
| 2005/0216005 A1 * | 9/2005 | Howland | 606/61 |
| 2006/0120822 A1 * | 6/2006 | Kaye et al. | 411/30 |
| 2009/0099609 A1 * | 4/2009 | Froehlich | 606/301 |

OTHER PUBLICATIONS

Voto SJ, Clark RN, Zuelzer, WA—"Arthroscopic Training Using Pig Knee Joints," Jan. 1988, one page Abstract only.
Lipke JM, Janecki CJ, Nelson CL, McLeod P, Thompson C, Thompson J, Haynes DW—"The Role of Incompetence of the Anterior Cruciate and Lateral Ligaments in Anterolateral and Anteromedial Instability. A Biomechanical Study of Cadaver Knees," Jul. 1981, one page Abstract only.

* cited by examiner

*Primary Examiner*—Kurt Fernstrom
(74) *Attorney, Agent, or Firm*—Chernoff, Vilhauer, McClung & Stenzel, LLP (57) ABSTRACT

A tray and a clamp mounted adjustably on the tray and supporting a leg or other limb or simulated limb including an articulated animal joint or a joint from a cadaver, for use in instruction of and practice by surgeons in joint replacement or other orthopedic surgery. A bone mounting device for fastening a joint to an artificial bone includes an expandable engagement member that fits within a cavity formed within a bone to hold the bone securely so that a surgical procedure can be performed on the joint.

23 Claims, 5 Drawing Sheets

FIG.3

APPARATUS AND METHOD FOR INSTRUCTION IN ORTHOPEDIC SURGERY

BACKGROUND OF THE INVENTION

The present invention relates to training surgeons and technicians in performing orthopedic surgical procedures such as joint repairs and joint replacements and is related particularly to instruction including performing procedures on cadaver parts or animal parts.

It is well known to use parts of cadavers or animal skeletal joints in training surgeons and technicians in various joint repair or replacement techniques. For fully effective training with respect to joint repairs in humans, however, practice on a human cadaver joint is a practical necessity. This is particularly true in becoming familiar with installation of new types of joint prostheses or with new techniques for installation of joint replacements.

While instructional use of cadaver body parts is very desirable, cadavers are quite costly, and it is desired not to waste the cadavers that are available by using an entire cadaver limb for practice of a procedure involving only one joint of that limb. Although it is desirable for procedures to be performed in a manner which realistically simulates performance of such a procedure on an actual patient, it is preferable and more economical to use only a smaller part, such as a knee joint, of a cadaver leg, since only the needed knee or other joint has to be purchased and shipped. This also leaves the remaining portions of the cadaver leg available for use by others.

In performing instruction concerning surgical joint repair procedures, conditions should simulate those of an actual surgical procedure as closely as practical, so that, for example, the training procedures can include reference to parts of a patient connected with but not actually part of a joint which is being repaired. Instructional conditions should also include being able to hold a joint used in a training procedure in a position similar to the position of that joint while it is being surgically repaired or replaced in a living patient. In the past, however, there has not been any particularly effective and economical way to use an animal joint or a cadaver part in connection with surgical instruction so as to simulate actual surgical conditions closely, yet without waste of cadaver parts not actually needed in the instructional procedure to be performed.

What is needed, then, is an apparatus and a method for instruction in and practice of surgical procedures on actual human cadaver parts or similar animal parts, with those parts presented in a manner realistically simulating conditions to be encountered during performance of similar procedures in living patients. Such apparatus desirably would be able to permit adjustment of the location and orientation of a cadaver part to simulate the possibilities available in actual surgical situations, but without the apparatus being unduly costly or large. Ideally the apparatus could be easily transported and would be self-contained, so that it could be used in various types of surroundings.

SUMMARY OF THE INVENTION

The present invention provides answers to some of the aforementioned needs and shortcomings of the prior art, as defined by the following claims.

As part of one aspect of the invention apparatus is provided to support a simulated body part, a cadaver part, or a similar animal part in a desired position for advantageous use in connection with instruction of surgeons and technicians regarding a chosen surgical procedure.

In one embodiment of such apparatus a clamp is mounted and supported so as to grip a bone adjustably and support a body part such as a limb or portion of a limb including such a bone.

As one aspect of the invention a bone mounting device is provided to enable a joint from a cadaver or an animal to be connected to a supporting member simulating or including a partial limb, so that a surgical procedure can be carried out on the joint in a realistically simulated setting.

As another aspect of the invention a bone mounting device includes an expandable engagement member that can be inserted into a cavity formed in a bone of a joint from a cadaver or an animal, to connect the mounting device securely to the bone.

As another aspect of the invention a method of instruction with respect to a surgical procedure includes supporting a cadaver part or an animal part as part of a simulated patient and in a position and orientation simulating those of an actual patient during surgery, so that a surgical procedure can be performed on the cadaver or animal part under conditions simulating an actual surgery and thus conducive to training and instruction.

The foregoing and other objectives, features, and advantages will be more readily understood upon consideration of the following detailed description taken in conjunction with the accompanying drawings.

DETAILED DESCRIPTION OF PREFERRED EMBODIMENTS

Figure 1:
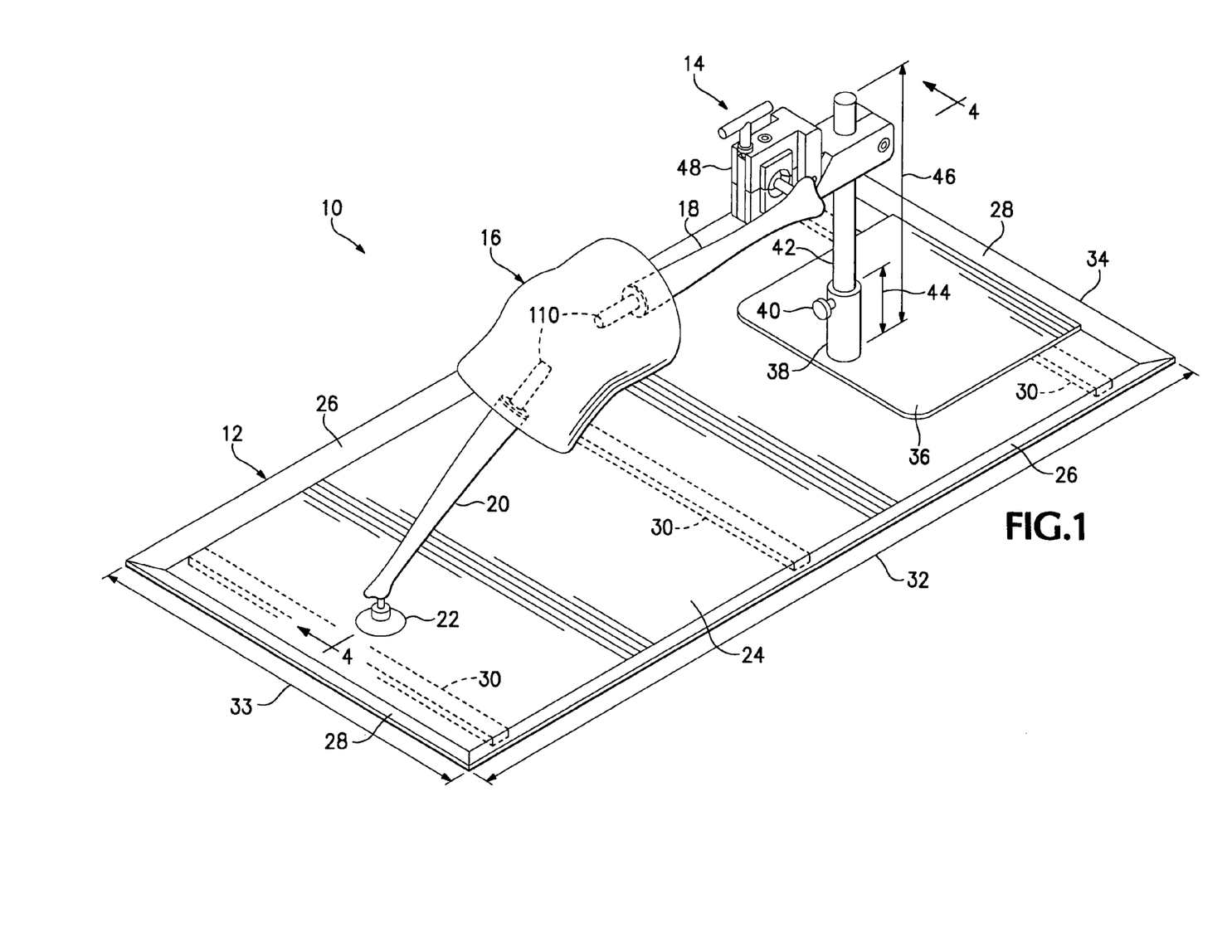
FIG. 1 is an isometric view showing apparatus embodying an aspect of the present invention, supporting a portion of a mammalian limb, such as portions of a femur and a tibia, together with a knee joint from a human cadaver.

Referring now to the drawings which form a part of the disclosure herein, an instructional apparatus 10 shown in FIG. 1 includes a tray 12, with which a clamp assembly 14 is associated. The apparatus 10 is shown in use to hold a knee joint 16 from a cadaver or an animal in a desired location and orientation so that a surgical procedure involving the knee joint 16 can be demonstrated or performed by a surgeon or medical student under instruction, in order to avoid having to learn a surgical procedure by performing it on a live patient.

As shown in FIG. 1 the clamp assembly 14 is used to hold an artificial partial femur 18, to which the cadaver knee joint 16 is attached. An artificial partial tibia 20 is also connected with the knee joint 16, to form a simulated left leg. A suction cup 22 is attached to the lower, or distal end of the artificial tibia 20 to support it and keep it in a desired location on the tray 12. It will be understood that other devices (not shown) such as cooperating tracks included in the tray 12 and fasteners associated with the artificial tibia could be used instead of the suction cup 22.

The tray 12 may be made of sheet metal, such as 14 gauge stainless steel, and has a flat bottom portion or main sheet 24, around which upwardly sloping side margin portions 26 and end martin portions 28 extend, forming a containment area for fluids which may drain from a body part on which a surgical procedure is being performed and providing an area where surgical tools, dissected tissue, or other items can be placed conveniently. The tray 12 may be of a size convenient for supporting an entire limb or simulated limb of a person, with a length 32 of about 50 inches and a width 33 of about 22 inches, for example. The side margin portions 26 and end margin portions 28 of the tray 12 may slope upward and outward at an angle of 45 degrees with respect to the plane of the main sheet 24 of the tray 12, to a height of about 1 inch, for example, with a ½ inch margin portion being folded outwardly and doubled back to provide additional stiffness for the pan.

Parallel transverse bars 30 or other reinforcing members may be provided near each end and at mid-length of the tray 12 or at other appropriate locations, to provide additional stiffness for the main sheet 24 of the tray and to provide suitable places where the tray 12 can be clamped to a supporting structure such as a table.

Near a first end 34 of the tray 12 a base plate 36, which should be of thicker material such as stainless steel plate ¼ inch thick, is mounted to the tray 12. The base plate 36 is preferably welded to the flat main sheet 24 of the tray 12 around the entire periphery of the base plate 36.

A socket 38 is securely fastened, as by welding, to the base plate 36, whose thickness provides ample stiffness and strength to support the socket 38 and the clamp assembly 14, together with a body part supported by the clamp assembly 14. The socket 38 may be made from stainless steel bar material, for example 1.75 inch in diameter, drilled to define a suitable bore, for example 1.0 inch in diameter, and may be equipped with a set screw 40 mounted in a transversely extending tapped hole extending into the bore of the socket 38.

A clamp support post 42 fits snugly but slideably within the socket 38 and is held in place by the set screw 40. The clamp support post 42 may also be of stainless steel and may include a hole to receive an end of the set screw 40, to fasten the clamp support post 42 securely into the socket 38 and prevent it from rotating. Other devices, such as cooperating keys and keyways (not shown), could also be used to keep the post 42 from rotating in the socket 38. The socket 38 may, for example, have a height 44 of about 4 inches, while the clamp support post 42 may have a length, or height, 46 of about 12 inches above the base plate 36, to support a limb or other body part conveniently for instructional use.

Other suitably strong and rigid materials such as fiber-reinforced polymeric resins could also be used for the tray 12, base plate 36, socket 38, and support post 42.

Figure 2:
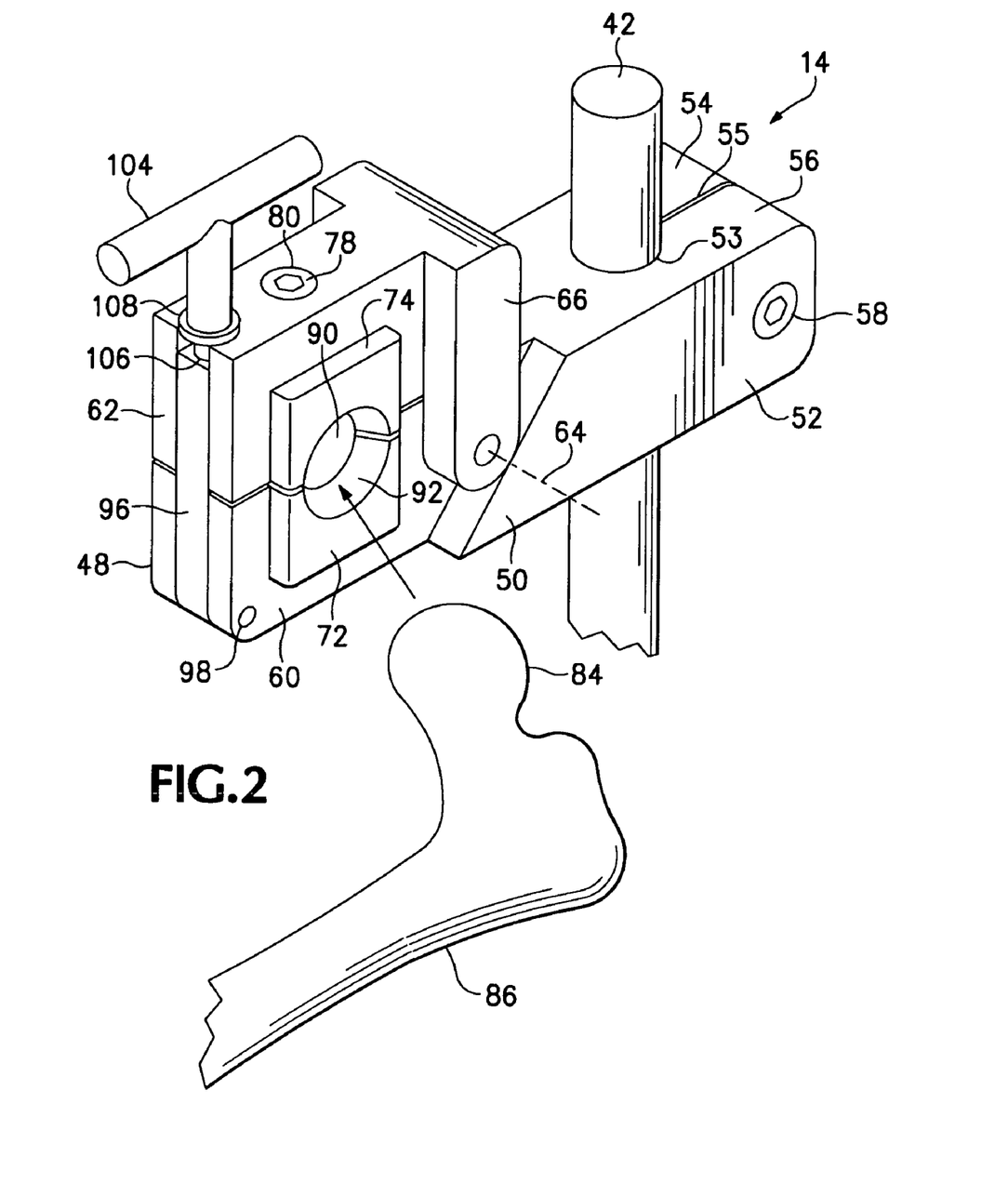
FIG. 2 is an isometric view of a clamp which is a part of the apparatus shown in FIG. 1, at an enlarged scale, together with a portion of a human femur and a portion of a supporting post.
Figure 3:
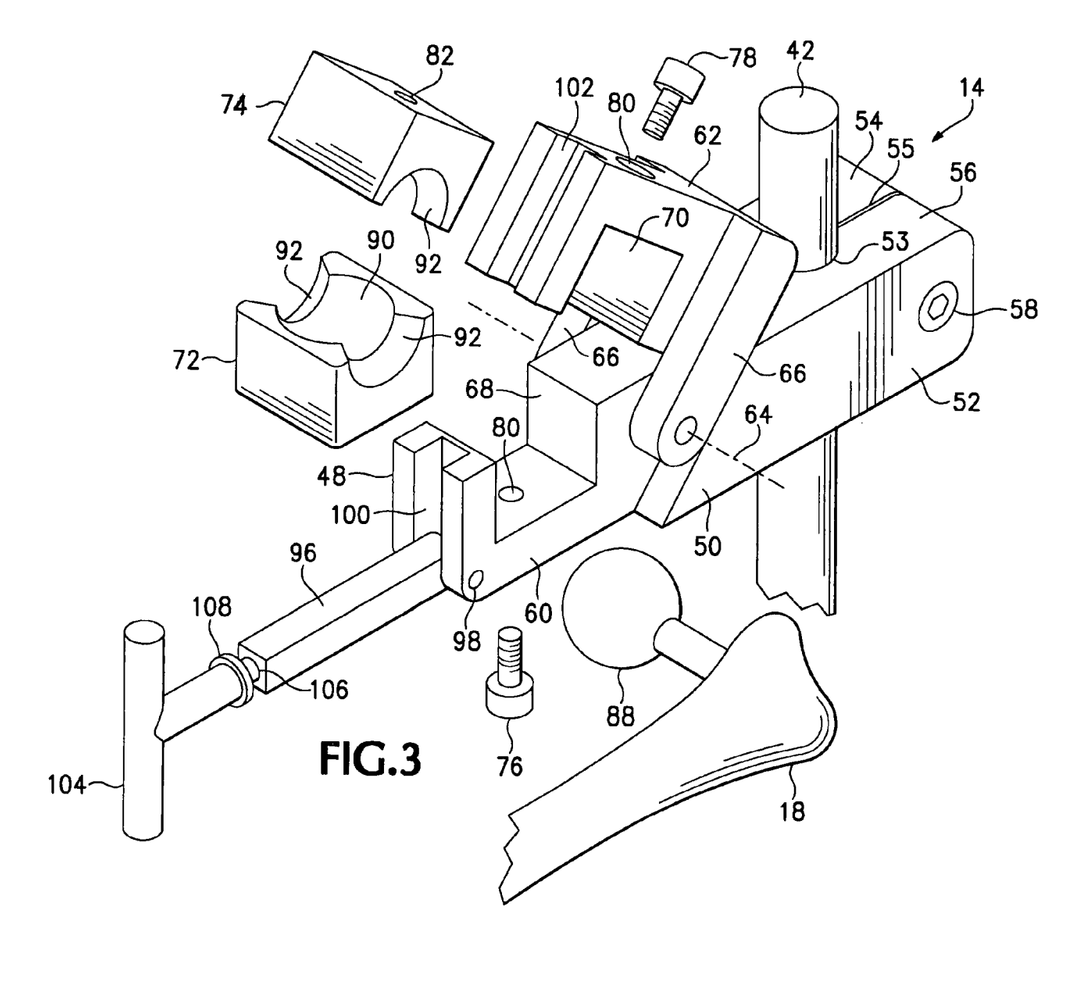
FIG. 3 is an isometric, partially-exploded view of the clamp and portion of a post shown in FIG. 2, showing the clamp open, together with a portion of an artificial femur.

Referring next to FIGS. 2 and 3, the clamp assembly 14 includes a bone clamp 48 at the front of a clamp body 50 whose rear portion 52 defines a bore 53 to receive the clamp support post 42, and two side portions 54 and 56 are defined by a slit 55 intersecting the bore 53. The side portions 54 and 56 can be pulled toward each other by a clamp bolt 58 to grip the support post 42 securely and thus hold the body 50 at a desired height and a desired angular position of rotation about the support post 42. It will be understood that other mechanisms might be used instead of the side portions 54 and 56 and clamp bolt 58 to connect the body 50 adjustably to the clamp support post 42.

Extending generally horizontally forward from the clamp body 50 is a first, or lower, jaw 60 that may optionally be an integral part of the body 50. A second, or upper, jaw 62 is movable with respect to the lower jaw 60 about a pivot axis 64 defined by a pivot pin extending horizontally through the lower jaw 60 and through a pair of fork arms 66 straddling the lower jaw 60 at the rear end of the upper jaw 62. The upper jaw 62 is movable upwardly apart from the lower jaw 60 about the axis 64 in alligator-jaw fashion to the open position shown in FIG. 3.

The jaws 60 and 62 define respective receptacles 68 and 70. As shown in FIG. 3 the receptacles 68 and 70 as shown are generally rectangular and hold corresponding generally rectangular grip blocks 72 and 74, although other corresponding shapes could be used instead. The grip blocks 72 and 74 are held in place in the receptacles 68 and 70 by respective fasteners such as screws 76 and 78 that are preferably countersunk in respective bores 80 extending through the jaws 60 and 62. The ends of the screws 76 and 78 are engaged in threaded bores 82 defined in the grip blocks 72 and 74.

The grip blocks 72 and 74 may be similar, with each defining a respective half of a spherical socket when the jaws 60 and 62 are aligned with each other in the closed position shown in FIG. 2, to receive and hold, for example, the generally spherical head 84 of a femur 86 shown in FIG. 2, or the spherical head 88 of the artificial femur 18 shown in FIG. 3. Each grip block 72 or 74 thus defines a generally hemispherical cavity or socket portion 90, and also defines a conical half of a throat 92 extending into and intersecting with the socket 90 from each lateral side of the clamp 48. Different pairs of grip blocks 72 and 74 may define sockets of different sizes to accommodate a particular artificial or natural bone to be held in the bone clamp 48. The socket cavity 90 thus may be provided in different sizes in order to receive and grip either the head 88 of the artificial femur 18, or the head 84 of the femur 86, whose size may differ from the head 88.

As shown in FIGS. 1 and 2, an adjustable latch is arranged to pull the jaws 60 and 62 of the clamp 48 adjustably toward each other to grip a bone in the socket 90. For example, a tension carrying member such as a tie bar 96 is attached to the lower jaw 60 by a pivot pin 98 holding a lower end of the tie bar 96. The tie bar 96 extends along and within a groove or channel 100 defined in the front face of the lower jaw 60 and aligned with a channel 102 in the front face of the upper jaw 62. A "T" handle 104 is connected adjustably with the outer or free end of the tie bar 96 by a threaded stud or bolt 106 mated in threaded bores defined in the tension bar 96 and in the "T" handle 104. The inner or lower end of the shank portion of the "T" handle 104, which may include a flange 108, is brought to bear on the upper or outer surface of the upper jaw 62 by turning the "T" handle 104 to adjust the bolt 106 to provide enough tension in the tie bar 96 to bring the jaws 60 and 62 toward each other. This urges the grip members 72 and 74 firmly into contact with the head 88 of the artificial femur 18, with the head 84 of the femur 86, or with a desired part of another selected bone to be held in the bone clamp 48.

The tray 12 and clamp assembly 14 may be used advantageously to support a selected portion of a cadaver in a desired position, so as to simulate the position of a similar part of a living patient during actual surgery, while instruction regarding a surgical procedure is given and the procedure is performed on a cadaver or animal limb or joint. When a procedure to be taught or practiced involves only a joint, the joint can be held in a desired position by use of a bone mounting device 110 to interconnect a part of a bone, such as the artificial part of a femur 18 or artificial part of a tibia 20, to the joint, as shown with a cadaver knee 16, in FIGS. 1 and 4.

Figures 4, 5, 6:
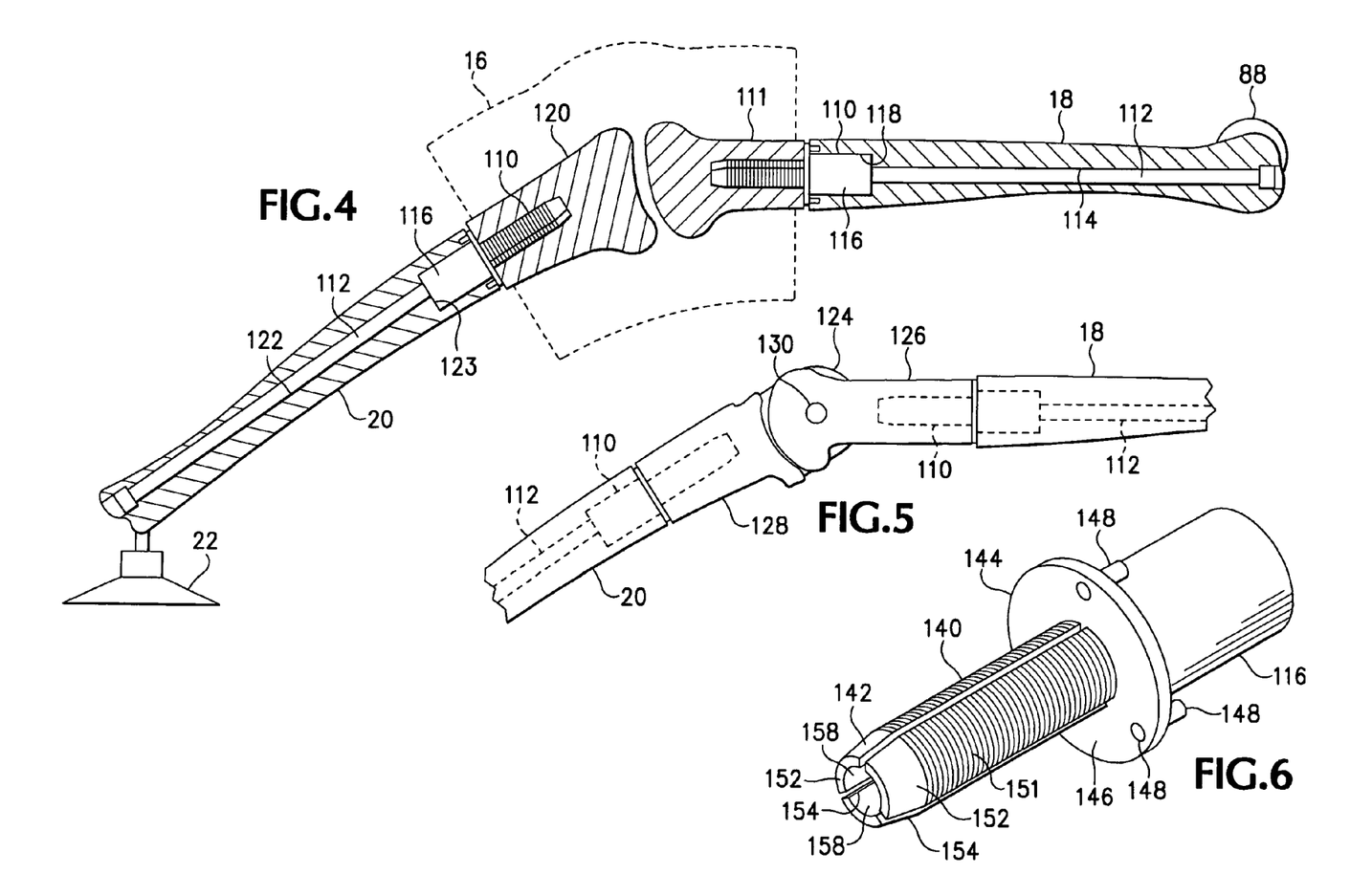
FIG. 4 is a sectional view of the knee joint, artificial partial femur, and artificial partial tibia shown in FIG. 1, taken along line 4-4 in FIG. 1.
FIG. 5 is a side elevational view of parts of the artificial portions of a femur and a tibia shown in FIG. 1, at an enlarged scale, with an artificial knee joint mounted between and interconnecting the artificial portions of a femur and a tibia.
FIG. 6 is an isometric view, at an enlarged scale, of the bone mounting device shown in FIG. 1, taken from the outer, or front, end of the mounting device.

A bone mounting device 110 is attached to the femur portion 111 of a cadaver knee joint 16 and then is mated with a part of a bone such as the artificial partial femur 18, as shown in FIG. 4. A long bolt 112 extends through a passage 114 defined in the artificial femur 18, holding a rearward extension portion 116 of the bone mounting device 110 in a cavity 118 defined in the artificial femur 18.

Similarly, a bone mounting device 110 is mated with the tibia portion 120 of the cadaver knee 16 and then is mated with the artificial part of a tibia 20 in generally the same fashion, with a bolt 112 extending through a passage 122 to hold the rearward extension portion 116 in a cavity 123 defined in the proximal end of the artificial partial tibia 20.

As shown in FIG. 5, instead of a cadaver knee 16, an artificial knee joint 124 may be attached to the artificial femur 18 and artificial tibia 20 using the mounting device 110 to connect a femur portion 126 to the artificial femur 18 and a tibia portion 128 to the artificial partial tibia 20. The artificial knee joint 24 includes a simple hinge joint with a pivot pin 130 interconnecting the femur portion 126 with the tibia portion 128 to permit the artificial tibia 20 to pivot with respect to the artificial femur 18. The artificial leg so constructed can be utilized in teaching certain aspects of surgical joint repair or replacement procedures where a cadaver joint is unnecessary or unavailable. For example, such an entirely simulated limb can be used to teach the use of an infrared imaging navigation system in connection with preparing an actual joint for replacement or corrective surgery.

Figure 7:
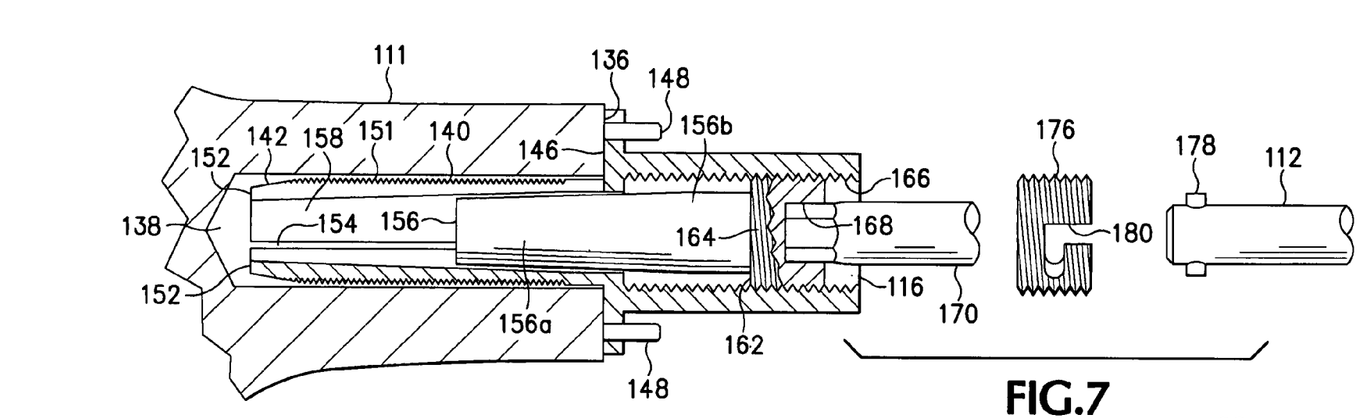
FIG. 7 is a sectional view corresponding to a portion of FIG. 4, at an enlarged scale, showing the mounting device shown in FIG. 6 during the process of being installed in the femur of the cadaver knee joint, together with a connector and a portion of a bolt that can be used to retain the mounting device in an artificial portion of a femur as shown in FIG. 4.
Figure 8:
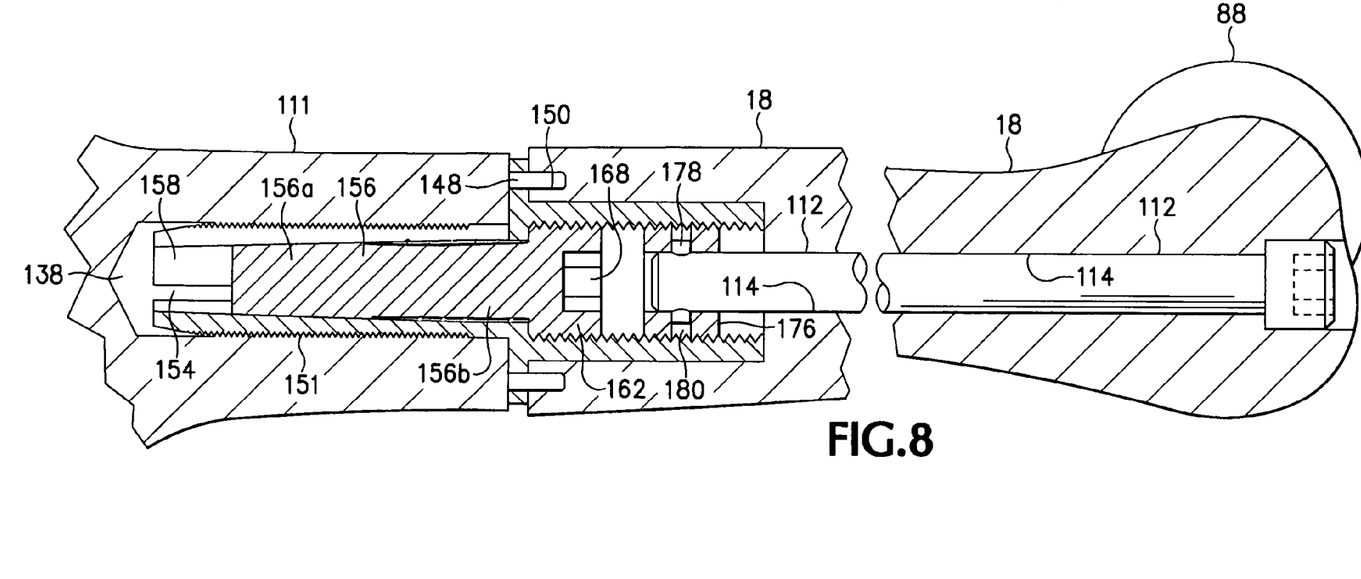
FIG. 8 is a sectional view, corresponding to a portion of FIG. 4, at an enlarged scale, showing the mounting device in use for interconnection of the femur portion of a cadaver knee joint to the artificial portion of a femur.

Referring now also to FIGS. 6, 7, and 8, the bone mounting device 110 is preferably of stainless steel or other metal but may be of a suitable composite material. It is utilized by engaging it in a corresponding cavity in the interior of a bone to which it is to be attached. Thus, in utilizing the mounting device 110 to attach a cadaver knee 16 to the artificial femur 18 and tibia 20, the cadaver knee 16 should be prepared by first cutting perpendicularly across the femur and tibia portions at a selected distance from the area of contact between the bones in the knee joint 16. This provides a generally planar end surface 136 of the femur 111, for example. A hole is then drilled longitudinally into the femur portion 111 to form a cylindrical cavity 138, as a receptacle for an expandable engagement member 140 of the mounting device 110.

As shown best in FIG. 6, the expandable engagement member 140 is generally cylindrical and may have a tapered outer end 142 to guide it into its required location within the cavity 138. The engagement member 140 extends forward from a base 144 having a flat forward face 146 that extends radially about the root or rear end of the engagement member 140 and rests against the end surface 136 of the femur bone 108 of the cadaver knee joint 16 when the mounting device 110 is in place. At least one locating pin 148 is fitted in the base 144 and extends rearwardly from the base 144 to fit in a corresponding hole 150 defined in an end of a corresponding part of a bone such as the distal end of a partial femur 18 or the proximal end of an artificial tibia 20, to prevent the bone mounting device 110 from rotating away from a desired position. As shown herein three locating pins 148 are provided, but more or fewer could be used, or other locating structures could be used instead to assure that the mounting device 110 fits in a proper relationship to the partial bone with which it is mated. For example, the rearwardly directed extension portion 116 shown herein has a circular cylindrical shape but could include an associated key or have a different shape such as that of a polygonal cylinder, with the cavity 118 or 124 having a mating keyway or non-circular cylindrical shape.

In order to mate securely with a bone, the engagement member 140 has an outer surface which can engage the adjacent bone tissue. For example, the outer surface may include sharp circumferential ridges 151, as shown herein, or it may be rough-textured and include sharp protuberances of other shapes that are brought to bear against and cut or dig into an interior surface of the cavity 138 when the engagement member 140 is expanded after insertion into the cavity 138.

Alternatively, the outer surfaces of the engagement member 140 may include other knurled shapes providing, for example, longitudinal or diagonal ridges or pyramidal points projecting outward to engage the interior bone surfaces defining the cavity 138 when the engagement member 140 is expanded.

In order to be expandable the engagement member 140 is divided into sectors, for example three elongate sectors 152 separated by planar slits 154, as shown in FIG. 6. While the expandable engagement member 140 is shown with its sectors 152 integral with the base 144 it should be understood that the sectors 152 could instead be separate pieces movably pinned or otherwise linked to the base 144.

The engagement member 140 is expanded radially into engagement with the interior surfaces of the cavity 138 by action of a wedge 156 bearing on interior surfaces 158 of the sectors 152. In the embodiment of the engagement member 140 depicted herein the interior surfaces 158 collectively define an interior cavity 160 in the form of a truncated narrow cone, with a cone angle of, for example, about two degrees of arc with respect to a central axis of the engagement member 140. The wedge 156 has a front portion 156a that may also be a truncated cone and preferably has a similar or slightly smaller cone angle, while a rear portion 156b may be cylindrical. As the leading end of the wedge 156 proceeds further into the interior cavity 160 defined by the interior surfaces 158 the wedge 156 forces the sectors 152 to spread further apart from one another, widening the slits 154. This, in turn, forces the exterior surfaces of the sectors 152 into deeper and firmer engagement against the interior surfaces of the cavity 138.

The wedge 156 has a head 162 carrying exterior threads 164 mated with an interior helical thread 166 defined within the extension portion 116, as shown in FIGS. 7 and 8. The head 162 includes a hexagonal socket 168 designed to receive a hexagonal driver 170 that can be used to turn the head 162 and thus force the wedge 156 longitudinally into the interior cavity 160. It will be understood that other types of drivers and corresponding configurations of the head 162 could be used as well, such as straight or cruciform slots or pinhole arrangements designed to be engaged by corresponding screwdrivers or special pin wrenches. It will also be understood that the wedge 156 and the interior cavity 160 may be designed to operate with wedging or cam action effected by relative movement in an opposite direction or in rotation to expand the engagement member 140.

Once the wedge 156 has been driven far enough into the interior cavity 160, as shown in FIG. 8, the mounting device 110 will hold the bone securely. The head 162 encounters the base member 144 to prevent the wedge from proceeding too far into the engagement member 140. Thereafter, the mounting device 110 can be inserted into the cavity 118 or 123 in the artificial femur 18 or artificial tibia 20, with the locating pins 148 engaged in the appropriately located holes in the end of the artificial femur 18 or tibia 20, or with an extension portion 116 of a noncircular shape being mated appropriately in a correspondingly shaped cavity 118 or 123.

In order to keep the extension portion 116 of the mounting device 110 mated with the artificial femur 18 or other bone, the bolt 112 is mated with the extension portion 116. This may be accomplished by use of a threaded quick-release connector 176 mated in the interior thread 166 of the extension portion 116. The quick-release connector 176 is threaded into the extension portion 116 until it is preferably at least nearly flush with the rear end of the extension portion 116 before the extension portion 116 is inserted into the cavity 118. Once the extension portion is inserted into the cavity 118 the bolt 112 can be inserted through the passage 114 from the opposite end of the bone and mated with the quick-release connector 176. A pin 178 is mounted transversely in the distal end portion of the bolt 112 and protrudes from at least one side of the bolt 112. The quick-release connector 176 defines an L-shaped slot 180, and the protruding end or ends of the pin 178 can be inserted to the bottom of the axial leg of the slot 180. Upon subsequent rotation of the bolt 112 the pin 178 enters the lateral part of the slot 180 and can then engage the connector 176 as shown in FIG. 8 so as to apply tension to pull the extension 116 tightly into the cavity 118. As the bolt 112 is turned it then screws the connector 176 further along the threads 166 until the bolt 112 pulls the mounting device 110 toward the opposite end of the partial femur 18 where the head of the bolt 112 is seated. Alternatively, mating threads (not shown) can be provided on the end of the bolt 112 and within the connector 176.

Another mounting device 110 is installed similarly in the tibia portion 120 of the cadaver knee 16 and is then attached to the artificial partial tibia 20, to form the simulated leg shown in FIG. 1.

Once the artificial partial femur 18 and artificial partial tibia 20 are attached to the cadaver knee 16 the head 88 of the artificial femur 18 can be placed into the socket 90 of the bone clamp 48, which can be tightened to hold the simulated leg in a position simulating the position of a person's leg during knee replacement or repair surgery. The cadaver knee 16 can then be dissected and manipulated, and a joint replacement prosthesis can even be installed with the artificial partial femur 18 held securely in a position determined by the grip of the clamp 48 on the head 88, while the tibia can be moved more easily by moving the suction cup 22.

While the instructional apparatus 10, including the tray 12, the clamp assembly 14, and the mounting device 110, has been described above with respect to instruction concerning knee repair or replacement, it will be appreciated that the apparatus 10 will also be useful in connection with instruction relating to surgery involving an arm, a shoulder, a hip, or other skeletal structures including a bone with which a mounting device 110 can be mated or that can be engaged by the bone clamp 48.

The terms and expressions which have been employed in the forgoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A mounting device for holding a bone, comprising:
   (a) a base member;
   (b) an expandable engagement member attached directly to and extending rigidly forward from said base member, said base member including an extension directed rearwardly away from said engagement member, said extension being tubular and defining an internal helical thread; and
   (c) a wedge having a head engaged with said internal helical thread of said base member, the wedge extending adjustably within said engagement member and adjustably forcing said engagement member into a radially expanded condition.

2. The mounting device of claim 1 wherein said base member includes a baseplate extending radially outward with respect to said engagement member and said extension.

3. The mounting device of claim 2 including an alignment member associated with said baseplate.

4. The mounting device of claim 1 wherein said extension has a generally cylindrical outer surface.

5. The mounting device of claim 1 wherein said head of said wedge includes an externally threaded portion engaged with said internal helical thread of said extension.

6. The mounting device of claim 5 wherein said wedge includes a driver receiving portion.

7. The mounting device of claim 1 in combination with an artificial portion of a bone, wherein said base member is attached to a first end of said artificial portion of a bone and said extension is fitted matingly within a cavity defined in said first end of said artificial portion of a bone.

8. The combination of claim 7 wherein said artificial portion of a bone has a second end and defines a longitudinal passageway extending from said second end to said cavity defined in said first end, and further including a fastener extending through said passageway and engaged with said internal helical thread defined in said extension so as to fasten said mounting device to said artificial portion of a bone.

9. The mounting device of claim 1 in combination with a portion of a bone, wherein said base member is attached to an end of said portion of a bone.

10. The combination of claim 9 wherein said extension is directed rearwardly away from said engagement member into a cavity defined in said end of said portion of a bone.

11. The mounting device of claim 1 wherein said engagement member includes a plurality of separate sectors extending longitudinally of said engagement member, each of said sectors being interconnected with said base member and including a respective interior surface arranged to cooperate with said wedge, whereby movement of said wedge within said engagement member in a predetermined direction moves said sectors radially apart from one another into said radially expanded condition.

12. The mounting device of claim 1 wherein said engagement member has an exterior surface including a bone-engaging surface configuration.

13. The mounting device of claim 12 wherein said bone engaging surface configuration includes a plurality of sharp protuberances.

14. The mounting device of claim 12 wherein said surface configuration is rough-textured.

15. The mounting device of claim 12 wherein said surface configuration includes a plurality of grooves and sharp-edged ridges.

16. The mounting device of claim 1 wherein said base member includes a baseplate extending radially with respect to said engagement member.

17. A method for training a person to perform a surgical procedure on an articulated skeletal joint, comprising:
  (a) providing a part of a bone;
  (b) mounting an articulated skeletal joint to said part of a bone to form a simulated portion of a limb including said joint, using a mounting device to support said part of a bone, the mounting device including:
    (i) a base member;
    (ii) an expandable engagement member attached directly to and extending rigidly forward from said base member, said base member including an extension directed rearwardly away from said engagement member, said extension being tubular and defining an internal helical thread; and
    (iii) a wedge having a head engaged with said internal helical thread of said base member, the wedge extending adjustably within said engagement member and adjustably forcing said engagement member into a radially expanded condition;
  (c) holding said simulated portion of a limb in a position simulating a position in which a similar limb of a living organism would be presented for performing said surgical procedure to repair the corresponding joint of said limb of a living organism;
  (d) carrying out the surgical procedure on said articulated skeletal joint.

18. The method of claim 17 wherein said articulated skeletal joint is a joint from a human cadaver.

19. The method of claim 17 wherein said articulated skeletal joint is a knee joint from a human cadaver.

20. The method of claim 19 including musculature, bone, and other tissue extending a predetermined distance above and below said knee joint.

21. The method of claim 17 wherein said surgical procedure is a total knee replacement procedure.

22. The method of claim 17 wherein said part of a bone is an artificial simulation of an actual bone.

23. The method of claim 17 wherein said articulated skeletal joint is from a non-human mammal.

* * * * *